United States Patent
Balemi et al.

(10) Patent No.: US 8,395,069 B2
(45) Date of Patent: Mar. 12, 2013

(54) METHOD AND APPARATUS FOR CONTROLLING AN ELECTRIC DISCHARGE MACHINING PROCESS

(75) Inventors: Silvano Balemi, Tenero (CH); Ivan Furlan, Brissago (CH); Walter dal Bo', Claro (CH)

(73) Assignees: Agie Charmilles SA, Losone (CH); Charmilles Technologies SA, Meyrin (CH)

( * ) Notice: Subject to any disclaimer, the term of this patent is extended or adjusted under 35 U.S.C. 154(b) by 685 days.

(21) Appl. No.: 12/580,676

(22) Filed: Oct. 16, 2009

(65) Prior Publication Data

US 2010/0096364 A1    Apr. 22, 2010

(30) Foreign Application Priority Data

Oct. 21, 2008    (EP) .................................... 08018394

(51) Int. Cl.
*B23H 1/02* (2006.01)
(52) U.S. Cl. ................ 219/69.13; 219/69.16; 219/69.17
(58) Field of Classification Search .................. None
See application file for complete search history.

(56) References Cited

U.S. PATENT DOCUMENTS 4,864,091 A * 9/1989 Boccadoro ................. 219/69.16
7,202,438 B2 * 4/2007 Asai et al. ................... 219/69.13

FOREIGN PATENT DOCUMENTS

| EP | 1093878 | 8/2000 |
|---|---|---|
| EP | 1918054 | 11/2006 |
| JP | 2002172525 | 6/2002 |

OTHER PUBLICATIONS

Alpeter, F. et al., "Modelling for EDM Gap Control in Die Sinking", Proceedings of the 13th International Symposium for Electromaching (ISEM XIII), Bilbao, Spain (May 9-11, 2001), pp. 75-83.

Sinh, H. V. et al., "A study of method to control EDMing process", Hanoi University of Technology and Ritsumeikan University Joint Symposium on Sensory-Motor Coordination in Robotic Manipulation, Kusatsu, Japan (Mar. 2-3, 2004), pp. 91-96.

Dehmer, J., "Prozeβführung beim funkenerosiven Senken durch adaptive Spaltweitenregelung und Steuerung der Erosionsimpulse", diss. (Jan. 1992) RWTH, Aachen, German (with 1 page English abstract).

Hu, M. et al., "Development of a linear electrostrictive servo motor", Precision Engineering, vol. 25 (Sep. 2001), pp. 316-320.

* cited by examiner

*Primary Examiner* — David E Graybill
(74) *Attorney, Agent, or Firm* — Harness, Dickey & Pierce, P.L.C.

(57) ABSTRACT

A method for controlling an electric discharge machining process, wherein a tool electrode is moved relatively to a workpiece with a working gap distance, wherein the process includes a current and at least one previous erosion cycle, the current and the previous erosion cycle each being divided into predetermined time intervals each including at least one discharge pulse, wherein similar working gap conditions are present within a time interval of the previous erosion cycle and of the current erosion cycle, and wherein subsequent erosion cycles are separated by a process pause cycle.

16 Claims, 10 Drawing Sheets

Fig. 11
- Conventional servo control
- Servo control using ILC
- Curve fitting

METHOD AND APPARATUS FOR CONTROLLING AN ELECTRIC DISCHARGE MACHINING PROCESS

CROSS-REFERENCE TO RELATED APPLICATIONS

This application claims the benefit and priority of European Patent Application No. 08018394.0, filed Oct. 21, 2008, the entire disclosure of which is incorporated herein by reference.

FIELD

The present invention relates to electric discharge machining (EDM), more specifically to a method and an apparatus for controlling an electric discharge machining process.

BACKGROUND

In general, known process control devices for regulating the working gap, that is the position of the tool electrode with respect to a workpiece electrode, are based on the principle that a desired signal is compared with a current signal to produce a signal indicative of the deviation, which is used as feedback signal.

Such method is known for instance from U.S. Pat. No. 4,864,091 in which a signal representing the current working gap distance is compared with a signal representing a desired working gap distance and the resulting error between these values is computed to generate a new command value for the drive motor. With this kind of approach, even if the same operation is performed repeatedly and under the same operating conditions, the valuable information incorporated on the tracking error of each repetition gets lost.

Since the type of discharge changes continuously in a stochastic manner, the control continuously corrects the working gap distance. In fact an effective normal discharge may be followed by any other type of discharge (see e.g. Dehmer, J.; diss. 1992 RWTH Aachen, Germany). In summary, conventional EDM process control reflects essentially the instantaneous process conditions. The nominal/current value comparison allows to safely control the process, but the movement of the controlled axis remains essentially bumpy.

Further, considerable time is spent to get a steady process condition after a process pause, in particular after every flushing motion. Besides the inevitable time spent for the flushing motion itself, some time is spent to conveniently approach the erosion front because commutation from a jump speed to an erosion speed must occur at a safe distance to avoid any damage of the electrodes. With elevated flushing motion frequency, the inconvenient is more significant.

An object of the present invention is to provide an improved EDM process control method leading, for example, to a less bumpy movement of the controlled axis and/or a smaller variation of the axis position of the tool electrode. This shall lead to higher productivity, i.e. increase of the material removal rate (MRR), reduction of the electrode wear and improvement of the surface quality and homogeneity.

Another object is to reduce the time to get a steady process after a process pause cycle.

SUMMARY

A first aspect of the invention is directed to a method for controlling an electric discharge machining process, wherein a tool electrode is moved relatively to a workpiece with a working gap distance, wherein the process comprises a current and at least one previous erosion cycle, the current and the previous erosion cycle each being divided into predetermined time intervals each comprising at least one discharge pulse, wherein similar working gap conditions are present within a time interval of the previous erosion cycle and of the current erosion cycle, and wherein subsequent erosion cycles are separated by a process pause cycle, the method comprising the steps of: measuring a value of a significant process parameter within a time interval of the previous erosion cycle, the significant process parameter being indicative of the working gap distance; determining a deviation value based on the measured value and a desired value of the significant process parameter of the time interval of the previous erosion cycle; and in the current erosion cycle, controlling the relative movement of the tool electrode in the erosion direction within the time interval of the current erosion cycle based on the deviation value determined for the time interval of the previous erosion cycle and at least one instantaneous process parameter being indicative of the instantaneous process conditions.

A second aspect of the invention is directed to an apparatus for controlling an electric discharge machining process, wherein the process comprises a current and at least one previous erosion cycle, the current and the previous erosion cycle each being divided into predetermined time intervals each comprising at least one discharge pulse, wherein similar working gap conditions are present within a time interval of the previous erosion cycle and of the current erosion cycle, and wherein subsequent erosion cycles are separated by a process pause cycle, the apparatus comprising: a process control for controlling the electric discharge machining process, and an axis drive, configured to drive a tool electrode, wherein the process control is configured to control the axis drive such that a tool electrode is moved relatively to a workpiece with a working gap distance and wherein the process control is further configured to execute a method according to the first aspect of the invention.

A third aspect of the invention is directed to an electric discharge machine comprising an apparatus according to the second aspect of the invention.

Further aspects of the invention are set forth in the dependent claims, the following description and the drawings. Other features are inherent in the methods and products disclosed or will become apparent to those skilled in the art from the following detailed description of embodiments and its accompanying drawings.

BRIEF DESCRIPTION OF THE DRAWINGS

Preferred embodiments of the invention will now be described, by way of example, and with reference to the accompanying drawings, in which.

DESCRIPTION OF THE PREFERRED EMBODIMENTS

Figure 1:
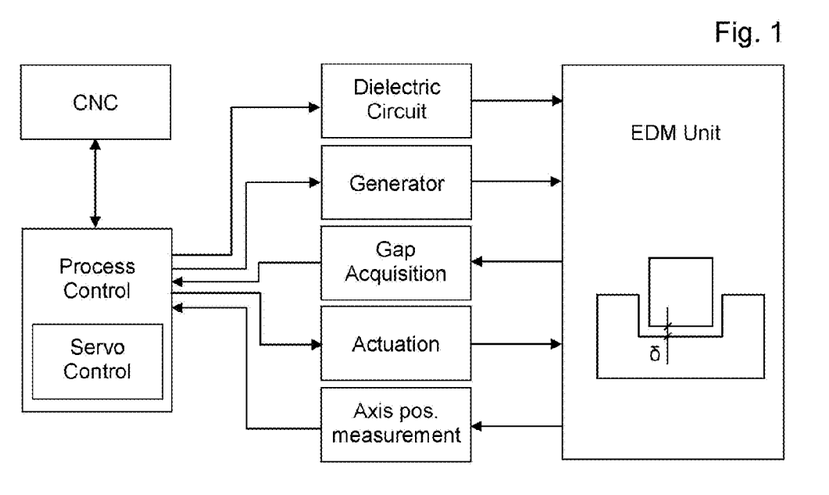
FIG. 1 is a functional diagram of an example of an electric discharge machine illustrating the present invention.

FIG. 1 shows a general block diagram of the main constituents of an example of a die-sinking electric discharge machine illustrating the present invention. A CNC control is responsible for the general control and coordination of the various units of the machine. Before a detailed description of the preferred embodiments, general explanations are given.

The Gap Acquisition element shown in FIG. 1 of an example of a die-sinking electric discharge machine provides a Process Control with an information about a working gap distance $\delta$, defined as the distance between a tool electrode and a workpiece electrode, by measuring and analyzing the characteristic discharge pulse signals, such as ignition delay time td, pulse voltage and current, gap conductivity, etc. The Gap Acquisition element may comprise a voltage detection to detect a working gap voltage, a first threshold to detect whether the detected voltage is an ignition voltage and a second threshold to detect the occurrence of a discharge, and a clock to detect the delay between the first and second threshold signal.

Another important information used by the Process Control is the current axis position of the tool electrode which is measured commonly by means of a rotary encoder mounted with an axis drive for the tool electrode or with a ballscrew and/or by means of a linear encoder fixed to machine slides. With these values the Process Control unit executes a regulation algorithm to generate the next position command for the position to be assumed by the axis to assure a good continuity of the electric discharge machining process. The other elements of the EDM machine are represented as a block (EDM Unit).

Figure 2:
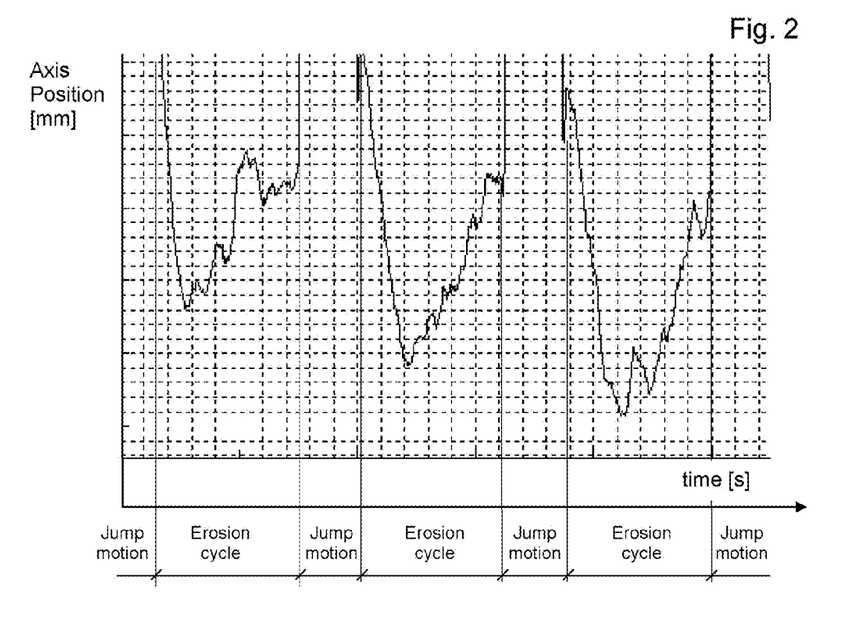
FIG. 2 is a plot of the axis position as a function of time.
Figure 6:
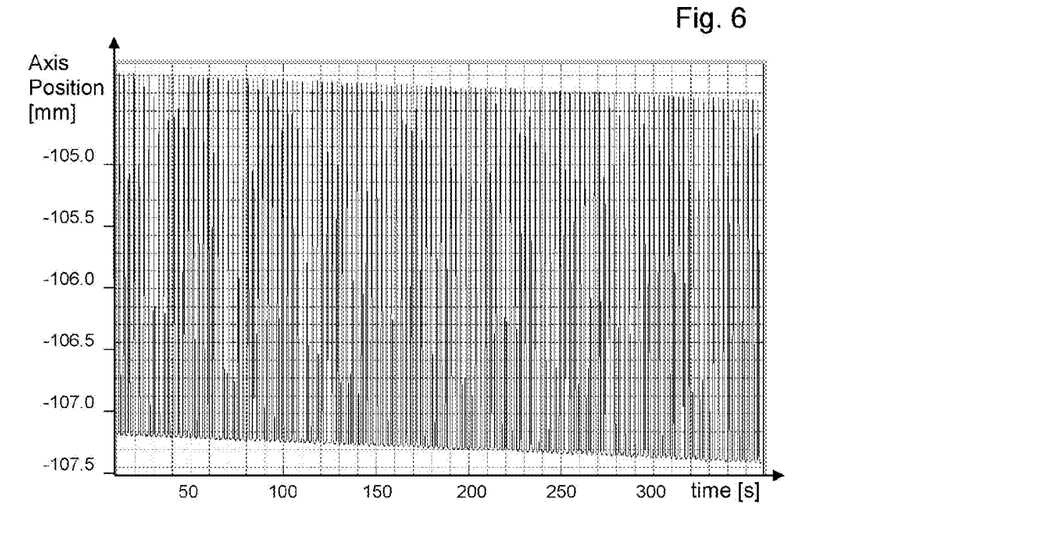
FIG. 6 is a plot of the axis position of a tool electrode as a function of time over a large number of discharge cycles.

FIG. 2 illustrates a typical movement of the working axis during a conventional die-sinking operation with a timed flushing motion by the tool electrode. Typically the working axis may be the z-axis, but any other axis or combination of axes (vector) of a die-sinking electric discharge machine can also be defined as working axis. With a conventional die-sinking operation the erosion cycles are characterized by a multitude of small and very quick up and down axis movements. The erosion cycles are periodically discontinued by comparably large high-speed motions that move the electrode away and immediately back to the workpiece. FIG. 6 shows a typical movement of the working axis over a large number of erosion cycles. In this example, a fixed flushing movement of 3 mm is performed every each 2.5 s. This kind of flushing movement, also called "jump motion", is required to remove the erosion debris, i.e. the particles removed from the workpiece by the action of the electric discharges from the working zone, as well as bubbles created by the erosion process in a fluid in the working gap. Jump motions are repeated with fixed periodicity and/or according to some specific algorithms.

The short peak at the end of the jump motion and at the begin of the erosion cycle is an overshoot due to sudden velocity change, when the control switches back to process control. Said overshoot is not relevant for the further understanding of the present invention.

The material removal by electric discharge machining, i.e. the erosion cycle itself takes place between the jump motions.

As explained above, an electric discharge machining process is sometimes conducted so as to follow a desired value of a signal representing working gap distance, such as an ignition delay time. In this case, after an approaching period at the begin of each erosion cycle, the working gap distance $\delta$ increases with the progression of the work. This is due to the fact that the erosion debris progressively contaminates the working gap, so that the conductivity rises and ignition delay time shortens. The Process Control compares the quantity of interest provided by the Gap Acquisition element with a reference value, and compensates by retracting the working axis, thus increasing the working gap distance.

With a conventional Process Control method illustrated in FIG. 2, the movement of the controlled axis during the erosion cycle is bumpy and the pattern of an erosion cycle is very different compared to the subsequent one.

Due to the stochastic nature of the EDM process, the signal measured by the Gap Acquisition element depends also on this stochastic nature (see f.i. Altpeter, F.; Tricarico, C.; "Modelling for EDM gap control in die sinking" in the Proceedings of ISEM XIII, pp. 75-83). However, the control of the process should not depend on said stochastic behavior but on the deterministic part of the process occurring at similar processing conditions.

In some embodiments of the invention such an influence of the stochastic nature on the control of the process is at least decreased.

Some embodiments of the invention refer to a method for controlling an electric discharge machining process. In some embodiments, such an electric discharge machining process is a die-sinking process.

Some embodiments of the invention provide an EDM process control method determining, for example, the direction and the speed of the electrode movement with an algorithm based not only on the current process control parameters, but also considering the input and output values of previous machining cycles. Thus, some embodiments are based on the assumption that a control of the process considering the historical information conducts to a less noisy, steadier behavior.

Figure 15:
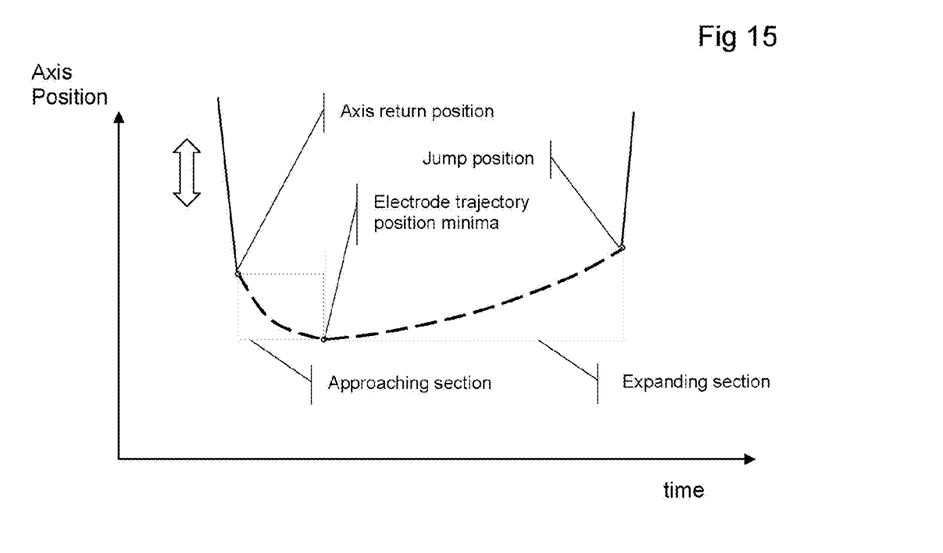
FIG. 15 is a simplified graph of the axis position of a tool electrode as a function of time, illustrating the phases of the erosion cycle.

The electric discharge machining process, also called "process" in the following, comprises recurring erosion cycles and at least one process pause cycle between the erosion cycles, i.e. subsequent erosion cycles are separated by a process pause cycle. Each erosion cycle comprises a plurality of discharge pulses. FIG. 2, for example, shows erosion cycles and also process pause cycles, referred to as jump motion in FIG. 2. FIG. 15 shows one erosion cycle and its different sections as an electrode trajectory with the z-axis motion of the tool electrode as ordinate and the time as abscissa. Firstly, the tool electrode approaches the work piece and the electrode trajectory shows a corresponding approaching section. The start of the approaching section of the electrode trajectory is given by an axis return position, which is the position in proximity of the workpiece at which the tool electrode is moved back to start the erosion cycle. The electrode trajectory of FIG. 15 shows further an expanding section—material removal takes place essentially during this section. As explained above, the working gap distance increases during the expanding section due to the contamination of the work gap. The expanding section ends at the jump position at which the erosion cycle ends and the process pause cycle starts.

During the process pause cycle one of the following might take place: a jump motion of the tool electrode, a prolonged process pause without erosion pulses, an active flushing pulse, a magnetic field pulse, or another tool electrode movement. The list of the events which may take place during the process pause cycle is open to any other action to restore the working gap conditions. The process pause confers a recurring pattern to the process and restores the working gap to same or similar initial conditions.

Two subsequent erosion cycles are interrupted or separated by one process pause cycle, i.e. also only one process pause is understood as a process pause cycle. The erosion cycles include a large number of discharge pulse, i.e. the pause between two discharge pulses during an erosion cycle is not to be understood as a process pause cycle. Thus, one (recurring) erosion cycle can be represented by the time period between two successive process pauses or process pause cycles. Further, in some embodiments, the start of a new erosion cycle is defined by a re-initialization of the process parameters.

Further, the recurring erosion cycles can be referred to as a current erosion cycle and previous erosion cycles. Within the current erosion cycle the relative movement of the tool electrode is controlled. A previous erosion cycle is a erosion cycle before the current cycle, but not necessarily the last erosion cycle before the current cycle, but any erosion cycle or even all erosion cycles before the current erosion cycle. In some embodiments, the process comprises only two erosion cycles, i.e. a current erosion cycle and a previous erosion cycle, wherein in other embodiments more than one previous erosion cycle exist. The erosion cycles may have the same or equal time duration, but they can also differ from each other.

The current erosion cycle and the at least one previous erosion cycle are each divided into predetermined time intervals, i.e. a time interval has a fixed length within an erosion cycle. The length of the time interval of the current erosion cycle and the length of the corresponding time interval of a previous erosion cycle can be different in some embodiments, while in other embodiments the length of these time intervals can be the same. The time intervals of one erosion cycle, for example of the current erosion cycle, can have the same lengths or different lengths.

The duration of one discharge pulse can be regarded as the minimum length of a time interval, while the length of one erosion cycle can be regarded as the upper limit for the length of a time interval. Hence, each time interval comprises at least one discharge pulse.

The tool electrode is moved relatively to a workpiece with a working gap distance, which is also referred to as "δ" in the following. The tool electrode is moved, for example, in the z-axis direction, i.e., for example, perpendicular to the workpiece, especially for die-sinking processes. However, any other movement of the electrode is also possible, such as movements in the x-y plane or three dimensional movements, or wherein the electrode rotates around its axis, including, for example circular or helical movements. In some embodiments, the tool electrode is moved in the erosion direction which influences the working gap distance, i.e. the working gap distance will become smaller or large by a tool electrode movement in the erosion direction. Moving the tool electrode relatively to the workpiece comprises moving the tool electrode while the workpiece is fixed, or moving the workpiece while the tool electrode is fixed or even moving both the tool electrode and the workpiece.

In some embodiments, the method comprises the steps of measuring a value of at least one significant process parameter within a time interval of the (at least one) previous erosion cycle, the significant process parameter being indicative of the working gap distance; determining the deviation value between the measured value and a desired value of the significant process parameter of the time interval of the previous erosion cycle; and, in the current erosion cycle, controlling the relative movement of the tool electrode in the erosion direction within the time interval of the current erosion cycle based on the deviation value determined for the time interval of the previous erosion cycle and at least one instantaneous process parameter being indicative of the instantaneous process conditions.

Instantaneous process parameters include for example: ignition delay time, mean pulse voltage, discharge voltage, the z-Axis value of the tool electrode, the ignition voltage, discharge current, discharge duration, the high-frequency component of the discharge voltage, etc. The significant process parameter within the time interval of the previous erosion cycle can be indicative of, for example, an ignition delay time, mean pulse voltage, discharge voltage, or any other value derived thereof being indicative of the working gap distance.

The deviation value is determined based on the measured value and a desired value of the significant process parameter of the time interval of the previous erosion cycle. This means, in some embodiments the error between the desired significant process parameter and the really measured value of the significant process parameter is determined. As mentioned above, the time interval of the previous erosion cycle can be as short as one discharge pulse. In such embodiments, for example, for each discharge pulse of the previous erosion cycle the corresponding deviation value is determined. The determination of the deviation value itself is time independent from the point of time of the measurement of the value of the significant process parameter, i.e. in some embodiments the value of the significant process parameter and the associated desired value are stored, e.g. in a memory, such that the deviation value can be determined at a later point of time.

In some embodiments also the mean value or other computed value of significant process parameters within the time interval or within more than one time interval may be taken for the determination of the deviation value.

It is assumed that similar working gap conditions are present within the time intervals of the current and the previous erosion cycles, i.e. similar working gap conditions may occur, for example, within similar parts of the electrode position trajectory of the current and previous erosion cycles. Similar working gap conditions occur, for example, with similar working gap distance and similar contamination of the working gap. Further, similar working gap conditions may occur at the beginning of an erosion cycle, especially, for example, after a re-initialization step in a process pause cycle after which working gap conditions are restored.

In the current erosion cycle the relative movement of the tool electrode in the erosion direction is controlled within the time interval of the current erosion cycle, i.e. a time interval where the same or similar working gap conditions are present as in the time interval of the previous cycle for that the deviation value is determined. The control of the movement of the tool electrode is further based on the determined deviation value, i.e. the determined deviation between the measured value of the significant process parameter and the desired value of it within the time interval of the previous erosion cycle influences the control of the movement of the tool electrode within the time interval of the current cycle.

Controlling the movement of the tool electrode in the erosion direction within a time interval of the current erosion cycle can be based on at least one instantaneous process parameter, wherein the at least one instantaneous process parameter reflects the instantaneous conditions of the working gap. In this way a degeneration of the process can be prevented by applying some countermeasures, or an electrode position trajectory can be corrected within the ongoing erosion cycle. For example, the contamination of working gap during the current erosion cycle may change more than expected or less than expected considering the determined deviation value of the time interval of the previous cycle. For instance the contamination may change less than expected when, for some reason, during the current erosion cycle a large number of pulses are ineffective and thus the material removal is less than expected. Hence, the controlling of the movement of the tool electrode based only on historical values might lead to a too small working gap distance. As a further example, the machining area may change within a die-sinking operation, whereby working gap conditions may change other than expected, leading to improper working gap distance. This can be prevented by also regarding the instantaneous process parameter.

Figure 4A:
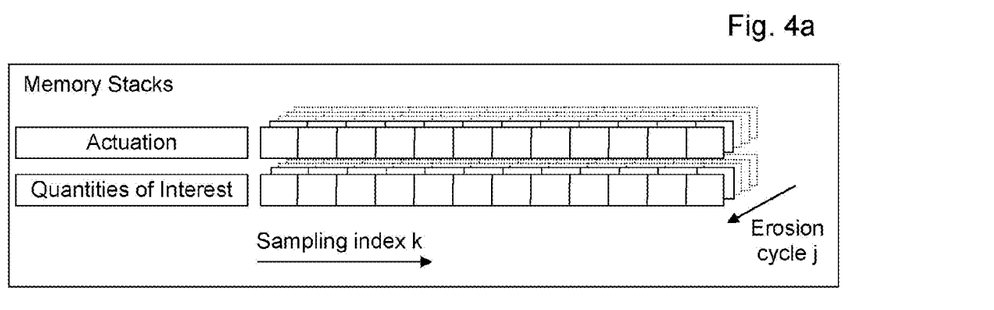
FIG. 4a is a scheme of memory stacks of an embodiment in accordance with the present invention.
Figure 4B:
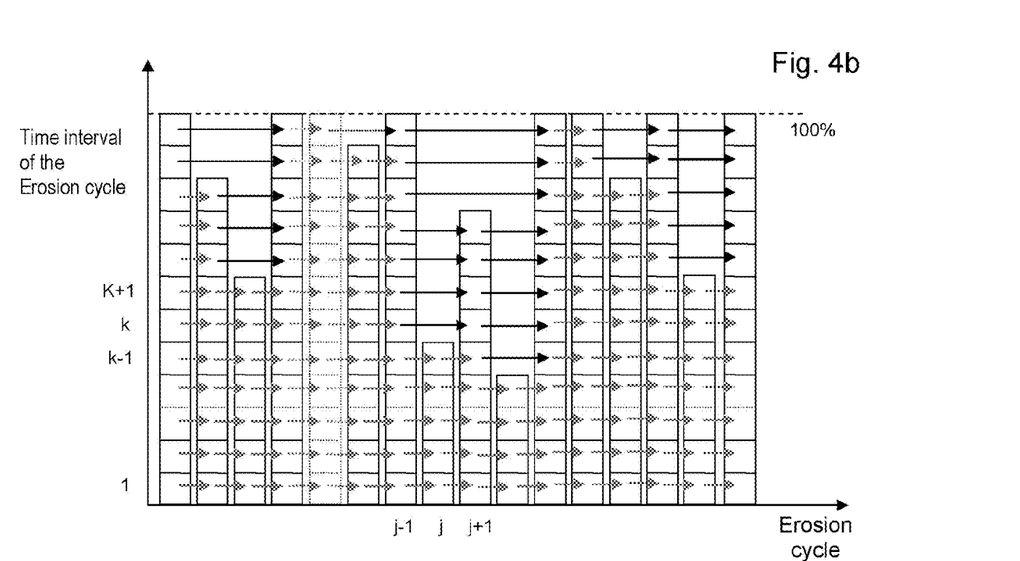
FIG. 4b is an diagram illustrating a sequence of erosion cycles having different lengths in time.

As illustrated in FIG. 4b, the amount of time intervals in the current erosion cycle and the previous cycle or cycles can be different or the same, since the erosion cycles may have different lengths of time. For example, an erosion cycle may be ended preterm, i.e. before the planned erosion cycle end time, if the instantaneous process conditions impose such action. The time intervals of the current erosion cycle and of the previous erosion cycle(s) are linked to each other by the assumption that there were same or similar working gap conditions present. In some embodiments time intervals refer to same or similar sections of the current and previous erosion cycles. Similar sections are sections being similar from the point of view of the working gap contamination, for example, sections where the corresponding electrode position trajectory of the previous and the current erosion cycle have a similar shape, or sections of the current and previous erosion cycles at same or similar points in time.

In some embodiments each current and previous erosion cycles are divided into predetermined time intervals 1, ..., k, ..., N, with k and N being integers and wherein N can be different for different erosion cycles. In some embodiments time intervals of the previous and the current erosion cycles refer to different sections of the erosion cycles but being similar from the point of view of the working gap contamination. For example, the deviation value is determined for the $(k-1)^{th}$ interval of the previous cycle and is used for the control within the $k^{th}$ interval of the current cycle. In some embodiments it is assumed, for example, that similar working gap conditions occur in the range of the $(k-5)^{th}$ time interval to the $(k+5)^{th}$ time interval. Thus, it is possible to use a deviation value determined for a time interval in the range of $(k-5), \ldots, k, \ldots (k+5)$ time intervals of the previous erosion cycle for controlling of the movement of the tool electrode at time interval k of the current erosion cycle.

In some embodiments, the deviation value is determined for a $k^{th}$ time interval of the previous erosion cycle and the relative movement of the tool electrode is controlled for the $k^{th}$ time interval of the current erosion cycle. The length of the $k^{th}$ time interval of the previous erosion cycle and the length of the $k^{th}$ time interval of the current erosion cycle are usually equal. The length of the $k^{th}$ time interval of the previous erosion cycle and the corresponding time interval of the current erosion cycle could be different or the same, but they should be associated to same gap conditions.

In some embodiments a command value for controlling the relative movement of the tool electrode within the time interval of the current cycle is generated, wherein the command value is based on the deviation value determined for the time interval of the previous cycle and the instantaneous process parameter for the time interval of the current cycle.

In some embodiments the axis position of the tool electrode is controlled in an EDM process, wherein a control generates a new command value to control the axis position of the tool electrode for the time interval of the current erosion cycle based on the instantaneous process parameters of the time interval of the current erosion cycle and the significant process parameter within a time interval of at least one past or previous cycle, or the determined deviation value (see above), when working gap conditions similar to the current ones were present (or for the respective time intervals where similar working gap conditions are assumed).

In some embodiments, for example, a control computes a tool electrode position trajectory on the basis of the at least one significant process parameter within at least one previous cycle, or of the deviation value determined for the time interval of the previous cycle, as described above. The electrode position trajectory of the current erosion cycle is defined, for example, by the electrode position trajectory of the previous erosion cycle and by the deviation values determined at each time interval of the previous erosion cycle. Further, the electrode position trajectory of the current erosion cycle may be defined as described above and by fitting a mathematical function.

In some embodiments the shape of an electrode position trajectory is preset and at least one process parameter, for example, the ignition voltage or the offset of the preset trajectory is changed within an erosion cycle or within a time interval of the erosion cycle. In general, the electrode position trajectory is the path which is described by the tool electrode in three dimensions. In a die-sinking process the electrode position trajectory is, for example, the z-axis path described by a tool electrode in an erosion cycle. In some embodiments the tool electrode position trajectory describes a function of movements in the erosion direction on the time axis. Thus, it is also possible to control the relative movement of the tool electrode, based on the computed tool electrode position trajectory. For instance, the tool electrode is moved in accordance with the computed or fitted tool electrode position trajectory and only some parameters defining, for example, the offset of the trajectory or the shape of the trajectory are adapted for the current erosion cycle or for the time interval of the current erosion cycle. Hence, it is possible to smoothly move the tool electrode, since the computed or fitted tool electrode position trajectory has a smooth shape.

In some embodiments the axis return position is adapted on the basis of at least one characteristic of at least one past electrode position trajectory or one characteristic of one time interval of the previous erosion cycle. The axis return position is, for example, the position at which the tool electrode is positioned after a process pause cycle to start an erosion cycle. By considering the electrode position trajectory, for example, the minimum of the electrode position trajectory can be derived. The minimum of the electrode position trajectory, i.e. for example in a die-sinking process the shortest distance between the tool electrode and the workpiece, can be used for deriving the axis return position. Further, from the electrode position trajectory an optimal axis return position can be computed in the sense that the tool electrode is positioned optimal to the erosion front such that the approaching section of the electrode position trajectory, as shown in FIG. 15 and discussed above, can be eliminated. In a preferred embodiment the axis return position coincides essentially with the first point of the computed electrode position trajectory. In this case the process begins with a predefined axis return position, being at a safe distance from the erosion front. With the successive cycles the axis return position is defined so as to fit with the first point of the electrode position trajectory. After a few cycles the electrode position trajectory assumes a nearly constant shape and the axis return position follows the progress of the erosion front in a smooth way. In this way the erosion is immediately resumed at the appropriate working gap distance after each jump motion. However, in particular cases, f.i. very heavy electrodes or extremely small electrodes it is advisable to maintain an increased working gap distance at the beginning of the cycle, so as to avoid any possible damage. In these cases, an axis return position can be computed with reference to the first point of the electrode position trajectory. Thus, in some embodiments the re-positioning of the tool electrode after a process pause cycle can be accelerated and the efficiency of the process can be improved. Applying an optimal axis return position leads to a more effective flushing motion, since the tool electrode is moved at high speed down to the initial working gap distance. In particular, the evacuation of debris accumulated in corner portions, which is difficult because the adverse hydrodynamic conditions, is enhanced by the stronger turbulence and larger flow rate in the close vicinity of the workpiece. In some embodiments, an optimal axis return position is automatically achieved at least after some erosion cycles. For instance, the deviation value determined for a time interval of the beginning of the previous erosion cycle can be used for controlling the axis return position for the current erosion cycle, i.e. for the time interval in the beginning of the current erosion cycle. By iteratively repeating the controlling of the axis return position in the current erosion cycle based on the deviation value determined for the previous erosion cycle, the axis return position is optimized from one erosion cycle to the next one.

In some embodiments at least one actuation parameter of a process pause is computed on the basis of at least one significant process parameter measured within at least one (time interval of the) previous cycle or on the basis of the determined deviation value (see above). The actuation parameter of a process pause cycle can be, for example, the length and/or frequency of a process pause cycle. In the case of a jump motion, the actuation parameter can be, for example, the length, the speed and/or frequency of the flushing movement. An actuation parameter of a process pause cycle can depend on a characteristic of a mathematical function representing the electrode position trajectory and/or on other parameter/s of previous electrode position trajectories. For instance, it is possible to conclude from a characteristic of the electrode position trajectory to the evolution of contamination of the working gap. Hence, it is possible to optimize the actuation parameters of the process pause cycle, for example, the frequency of a jump motion.

In some embodiments the determined deviation value of the measured value and a desired value of the significant process parameter of the time interval of the previous erosion cycle are not only used to control the relative movement of the tool electrode (and thus the working gap distance) within the time interval of the current erosion cycle, but further, to control other actuation parameters within the current erosion cycle. Other actuation parameters include at least one of: an ignition voltage, a discharge current, a discharge duration, a pulse pause time (i.e. the length of the pause between successive discharge pulses), a pulse frequency, the frequency and/or stroke of a short jump motion within an erosion cycle (as described later), and any other actuation influencing the EDM process. In this way the efficiency of the process can be improved further.

In some embodiments, the recurring erosion cycle is represented by a complete micro electric discharge machining drilling operation. Thus, in such embodiments it is possible to optimize the drilling of subsequent drilling operations by considering at least one significant process parameter being indicative of the instantaneous process conditions within at least one previous drilling operation or the determined deviation, respectively.

One control which is used in some embodiments and which considers historical information is the so called Iterative Learning Control (ILC), which is a method of tracking control for systems that work in a repetitive mode, i.e. repeating the same task under same or similar conditions. ILC updates the command value for a repeating task iteratively, in such a way that the deviation between the desired and the current behavior of the system to be controlled is reduced with each successive cycle. ILC has been applied successfully in several applications. For repeating tasks, excellent feed-forward signals can be designed, whereas ILC is less performing when the task varies or when it is subject to perturbations. Nevertheless ILC presents some advantages in presence of stochastic perturbations, as it can provide filtering of signals using information from past cycles.

Electric Discharge Machining is a comparably slow process, characterized by a non-deterministic behavior, because the current discharge type does not necessarily determine the next discharge type. However EDM has a generally stepless progression, with certain comparatively prolonged recurring patterns, so that the basic prerequisites for implementing a process control with ILC are given.

Some of the embodiments presented herein aim to reduce or even eliminate the effect of the stochastic behavior of the machining process by optimizing the process conditions which are similar at recurring intervals. In some embodiments, the method involves the examination and characterization of the erosion cycle. At least one significant process parameter and/or the axis position is stored at discrete time intervals during an erosion cycle. These parameters (or values inferred thereof) in conjunction with the present process parameters are then fed to an algorithm to generate a new control value.

In some embodiments, one of the above mentioned methods and/or method steps are implemented in an apparatus for controlling an electric discharge machining process. The process comprises recurring erosion cycles, i.e. a current and at least one previous erosion cycle, the current and the previous erosion cycles each being divided into predetermined time intervals each comprising at least one discharge pulse, wherein similar working gap conditions are present within a time interval of the previous erosion cycle and of the current erosion cycle. Subsequent erosion cycles are separated by a process pause cycle, as explained above. The apparatus comprises a process control for controlling the electric discharge machining process, and an axis drive, configured to drive a tool electrode, wherein the process control is configured to control the axis drive such that a tool electrode is moved relatively to a workpiece with a working gap distance. The process control is configured in some embodiments to implement at least one of the above mentioned method steps. For example, the process control is configured to measure a value of at least one significant process parameter within a time interval of the at least one previous erosion cycle, the significant process parameter being indicative of the working gap distance; to determine a deviation value based on the measured value and a desired value of the significant process parameter of the time interval of the previous erosion cycle; and, in the current cycle, to control the relative movement of the tool electrode in the erosion direction within the time interval of the current erosion cycle based on the deviation value determined for the time interval of the previous erosion cycle and at least one instantaneous process parameter being indicative of the instantaneous process conditions.

Some of the embodiments refer to electric discharge machine comprising the apparatus explained above.

Referring back to FIG. 3 there is shown the general structure of an embodiment of a control system for an electric discharge machine. The control system comprises a process control and an axis drive for controlling an electric discharge machining process. The process control has an input at which $y_{ref}$ is fed in, which is the reference value of the quantity of interest, i.e. the significant process parameter as introduced above. The parameter $y_{ref}$ is fed into a "Learning Control" which produces an axis set point $z_{ref}$, of the tool electrode. The parameter $z_{ref}$ is fed into a "Servo Control" which produces a corresponding motion command u derived from $z_{ref}$. The servo control controls an "Axis Drive" by providing the motion command u to the axis drive. The axis drive provides the measured axis position z to a "EDM Process" unit which outputs the measured quantity of interest y. The measured axis position z is also provided to the servo control and the learning control for further processing. For instance, instead of $z_{ref}$ also the measured axis position z can be used in the following, since in general the deviation between the measured axis position z and the axis set point $z_{ref}$ is small. The measured value y of the quantity of interest $y_{ref}$ is also provided to the learning control. The axis set point ($z_{ref}$) is stored at each sample time of at least one previous erosion cycle in an "Actuation Memory" included in the process control. Similarly, the measured value of the quantity of interest (y) is stored at each sample time of at least one previous erosion cycle in a "Quantity of Interest Memory". The Actuation Memory and the Quantity of Interest Memory can also be part of only one memory unit. The learning control analyzes these values and generates the new axis set point ($z_{ref}$). A feed forward section marked "FF" bypasses the Learning Control, by directly influencing the axis set point ($z_{ref}$). This may be used transitionally to improve the dynamic behavior of the process, for example, when process conditions are expected to change, such as at the beginning of a machining operation, at the breaktrough of a drilling operation, when the surface of the engaged tool electrode and workpiece changes, etc. In such cases, an appropriate value of $y_{ref}$ can be used to directly affect the reference signal for the Servo Control.

Figure 3:
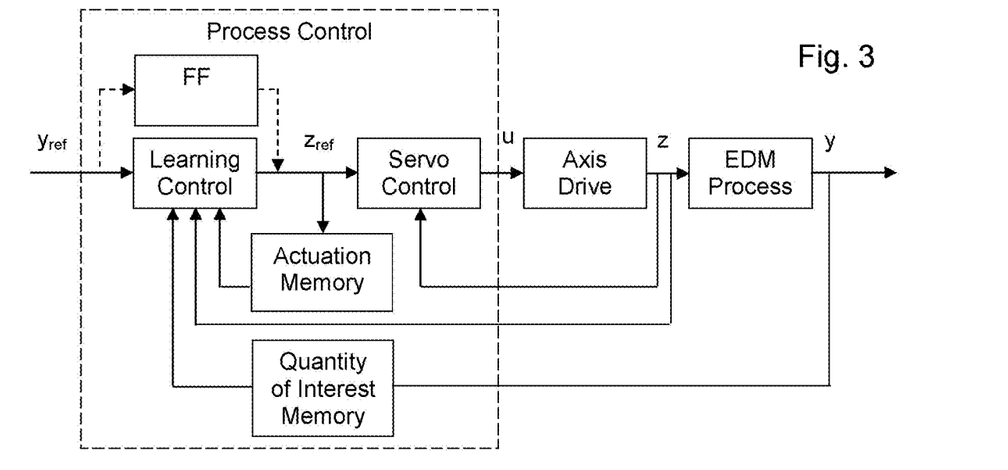
FIG. 3 is a block diagram of an embodiment of a general learning control implementation in accordance with the present invention.

An example of the structure in the actuation and the quantity of interest memory of FIG. 3 is shown in FIG. 4a. For each time sample index k and for each erosion cycle j a corresponding value of the quantity of interest y and the axis set point $z_{ref}$ is stored in the quantity of interest or the actuation memory, respectively. In some embodiments, the actuation memory and the quantity of interest memory are updated with the current values of the quantity of interest y and the new axis set point $z_{ref}$ at each time sample index k (also corresponding to a time interval k) of each current erosion cycle j. Also the actuation memory and the quantity of interest memory can be updated less frequently with the current values, for example each two or more erosion cycles.

In this embodiment of the invention the control system determines the axis position of an EDM process composed of recurring cycles as a result of the optimization of the electrode position trajectory. The optimization of the electrode position trajectory is based on the characteristic of past discharges, when working gap conditions similar to the present ones were available. In other words, a value related to the working gap distance error encountered in the past cycle is introduced to control the axis position in the current cycle.

Figure 5:
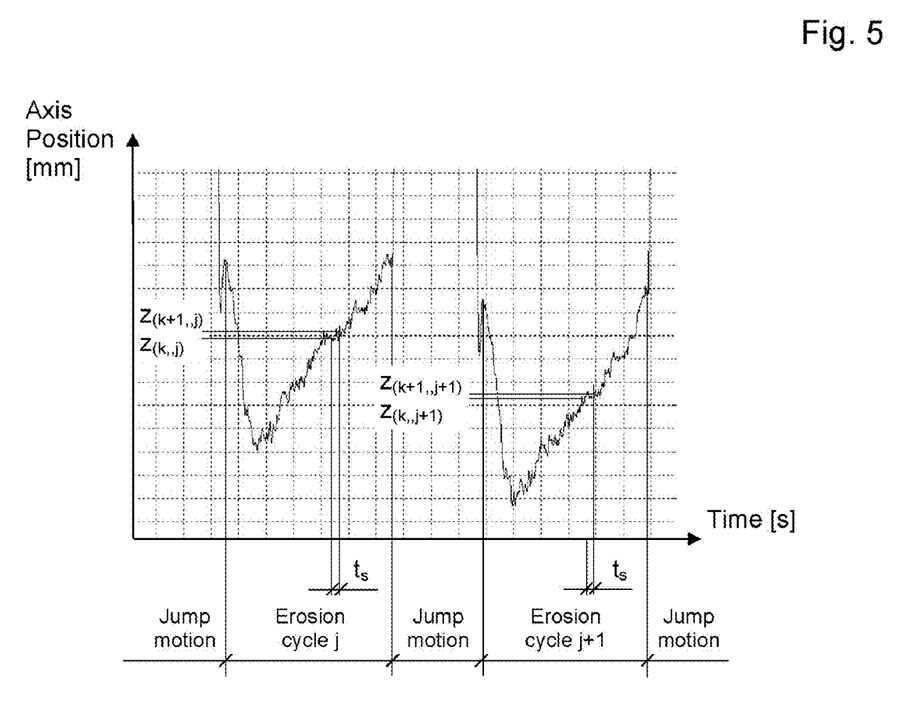
FIG. 5 is a plot of the z-axis position of a tool electrode as a function of time, with the parameters and indexes as used with the control algorithm, according to an embodiment of the present invention.

FIG. 5 shows the parameters and indexes as used with the ILC control algorithm in an embodiment of the invention. The graph illustrates the z-axis position of the tool electrode of two successive erosion cycles j and j+1 as a function of the time. The axis position can be measured by means of a linear encoder. For each point of time within an erosion cycle j, a corresponding measured z-axis position is determined. The measured z-axis positions are designated as z(k,j) and z(k+1,j) within the current cycle j at successive points of time or time intervals (k and k+1) and z(k,j+1) and z(k+1,j+1) correspondingly for the next cycle j+1.

An initial electrode position trajectory z(k,1) represents the axis position measured at the time k*ts of an initial erosion cycle, where ts is the sampling time and k is the sampling index within an erosion cycle, with 1<=k<N. The process is executed in successive erosion cycles j, leading to electrode position trajectories z(k,j).

The deviation or error e(k,j) at sampling index k of erosion cycle j between the reference value of a considered quantity of interest at sampling index k and the measured value of the considered quantity of interest at sampling index k of erosion cycle j (f.i. $e(k,j) = td_{ref}(k) - td(k,j)$) is used to update the axis position set point $z_{ref}(k,j+1)$ at sampling index k of the next erosion cycle j+1, i.e. $z_{ref}(k,j+1) = f(z_{ref}(k,j); e(k,j))$, f.i. with the law $z_{ref}(k,j+1) = z_{ref}(k,j) + k^*e(k,j)$.

However, the update of the axis position set point $z_{ref}(k,j)$ is not restricted to using the error at sampling index k of erosion cycle j but can also depend on quantities at previous sampling indexes k−1, k−2, k−3, . . . of the current or of previous erosion cycles as well as on quantities at future sampling indexes k+1, k+2, k+3, . . . of previous erosion cycles. This implies a dynamic dependency of $z_{ref}(k,j)$ on different quantities and includes the combination between iterative learning control and classical closed-loop control.

Furthermore, the update of the axis position set point $z_{ref}(k,j)$ can also depend on past, current or future values of the reference value $y_{ref}$ of the considered quantity of interest. For instance $z_{ref}(k,j)$ may be an explicit function of $td_{ref}(1), \ldots, td_{ref}(N-1)$ (where td is the ignition delay time). Therefore, this includes the possibility of feed-forward control.

At the begin of the machining operation (erosion cycle 1) and when the ILC process control is activated, the commanded axis positions, the axis positions and the error e between the reference value and the measured value of the considered quantity of interest are stored at each sampling time. With the next erosion cycle, the electrode position trajectory is determined by the actual process conditions and by the currently measured and stored quantities. The method is repeated with each successive erosion cycle. In this manner the electrode position trajectory increasingly reflects the current and the historical process conditions.

Updating the axis position set points as described in the above embodiment can lead to slow convergence, respectively to remaining fluctuations of the electrode position trajectory, because this first embodiment represents a compromise between the adaptability to process changes and the insensitivity to process noise.

An alternative embodiment of the invention is to not modify the command value or axis set point of every individual time instant in the trajectory but to define a part or the whole electrode position trajectory with a smooth curve. Said curve is determined by computing the optimal coefficients of the selected mathematical function. The function used as a basis for the trajectory may be a line, a parabola, etc.

In this case, the initial electrode position trajectory $z_{ref}(k, \theta(1))$ represents the axis position measured at the sampling index k of the initial erosion cycle j=1, where θ is a set of coefficients of the curve determining the electrode position trajectory. The process is executed in successive erosion cycles j, leading to new electrode position trajectories $z_{ref}(k, \theta(j))$.

The errors e(k,j) at all sampling indexes k (1<=k<N) of erosion cycle j between the reference value of a considered quantity of interest and the measured value of the considered quantity of interest, for instance $e(k,j)=td_{ref}(k)-td(k,j)$ are used to update the coefficients θ(j+1) of the curve determining the electrode position trajectory of the next erosion cycle j+1, i.e. θ(j+1)=f(θ(j); e(1,j); . . . ; e(N-1,j)).

However, the update of the parameters θ(j) is not restricted to known values of quantities at sampling k of erosion cycle j but can also depend on quantities at previous sampling indexes k-1, k-2, k-3, . . . of the current or of previous erosion cycles, as well as on quantities at future sampling indexes k+1, k+2, k+3, . . . of previous erosion cycles. This implies a dynamic dependency of θ(j) on different quantities and includes the combination between iterative learning control and classical closed-loop control.

Furthermore, the update of the parameters θ(j) can also depend on past, current or future values of the reference of the considered quantity of interest (f.i. θ(j) may be an explicit function of $td_{ref}(0), \ldots, td_{ref}(N-1)$). Therefore, this includes the possibility of feed-forward control.

Figure 11:
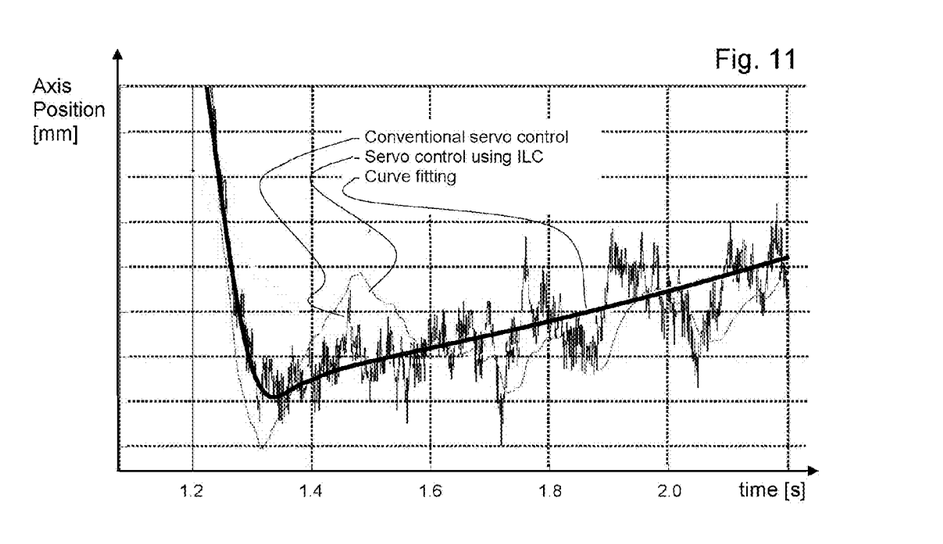
FIG. 11 is a plot of the axis position of a tool electrode as a function of time, comparing a conventional process control and an embodiment of the process control using ILC in accordance with the present invention.

The coefficients of the mathematical function determining the electrode position trajectory can be determined and updated by polynomial regression. In this case, the best fitting curve is preferably represented as polynomial of order n, whereas the coefficients can be determined with the method of Least-Squares (LS) or Recursive Least-Squares (RLS). The RLS-method has the advantage that the coefficients of the polynomial are continuously updated so as to reduce the computing time at the end of a cycle. In the case depicted in FIG. 11 a polynomial of $3^{rd}$ order may be adequate to describe the smooth fitting electrode position trajectory of a process control for regulating the working gap distance of an EDM process composed of recurring cycles. FIG. 11 shows three curves representing the z-axis position as function of time yielded with a conventional servo control, a servo control using ILC and the smooth curve resulting from a curve fit of the output values of an ILC.

Other methods and criteria may be used to approximate the electrode position trajectory, instead of the above method of polynomial regression.

If for any reason at a certain instant the measured value of the considered quantity of interest appears inconsistent or is not within certain boundaries, then the values of register k (see, for example, FIG. 4b) may remain unchanged or may be replaced with a computed value.

FIGS. 7, 8, 9 and 10 respectively show the axis position as a function of time during three discharge cycles of a die-sinking operation.

Figure 7:
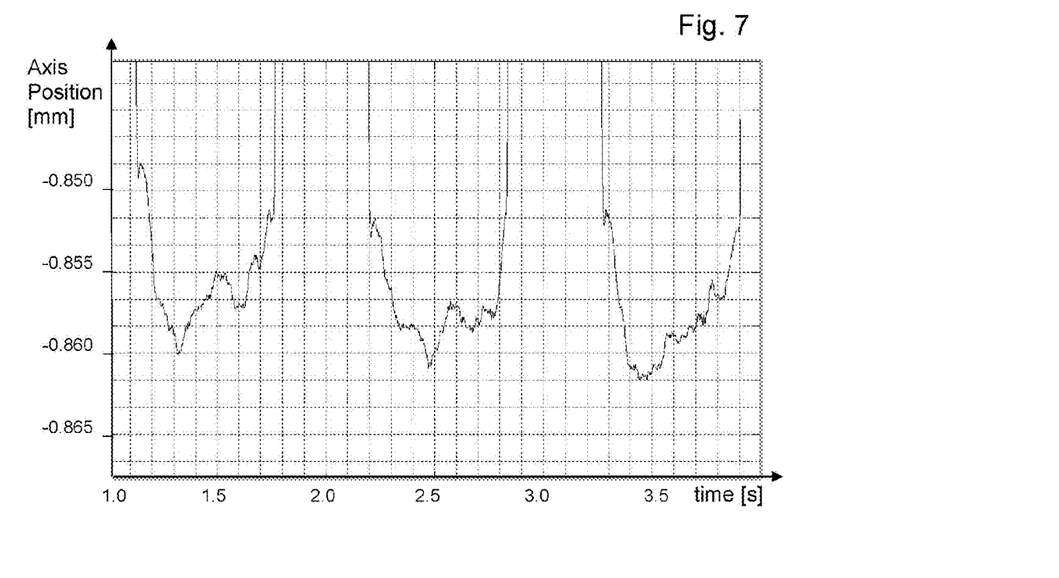
FIG. 7 is a plot of the axis position of a tool electrode as a function of time with an example of a process control illustrating the present invention.

The process illustrated in FIG. 7 is conducted with a conventional proportional process control. Under normal process conditions the axis position is continuously corrected considering essentially the instantaneous value of a significant process parameter within the same erosion cycle, with a notable variation of the electrode position and, thus, of the working gap distance δ. Also, it is recognizable that the congruence between the cycles is low.

Figure 8:
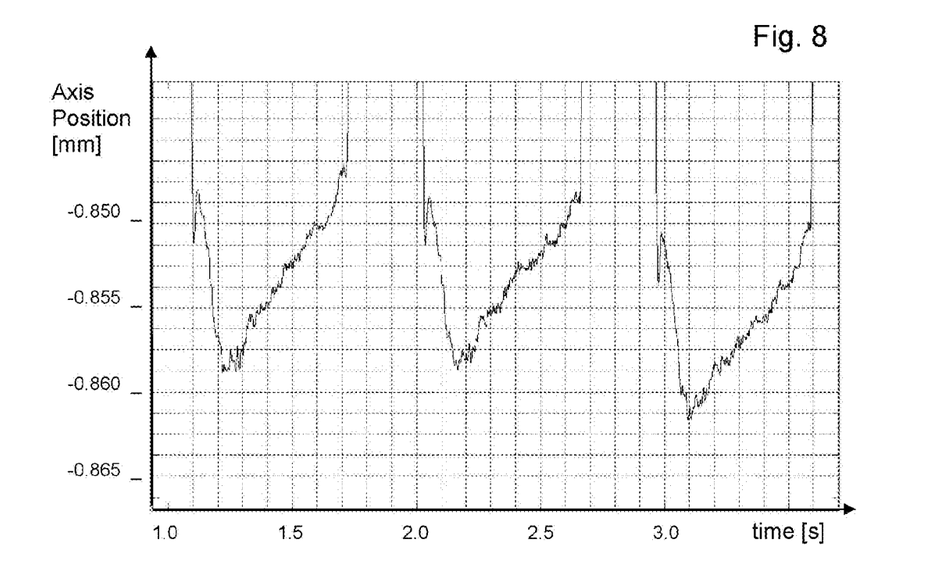
FIGS. 8, 9 and 10 are plots of the axis position of a tool electrode as a function of time with a process control using ILC, according to an embodiment of the present invention.
Figure 9:
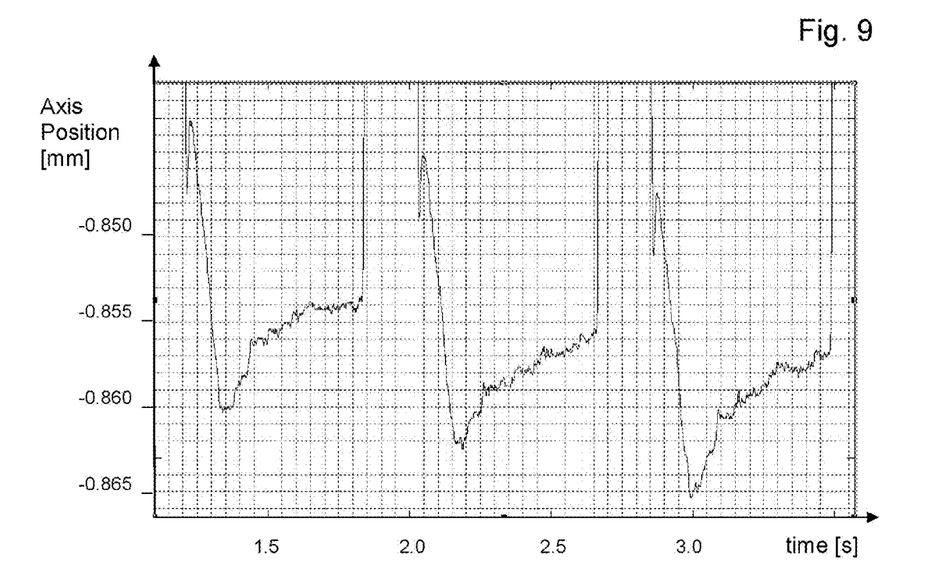
Figure 10:
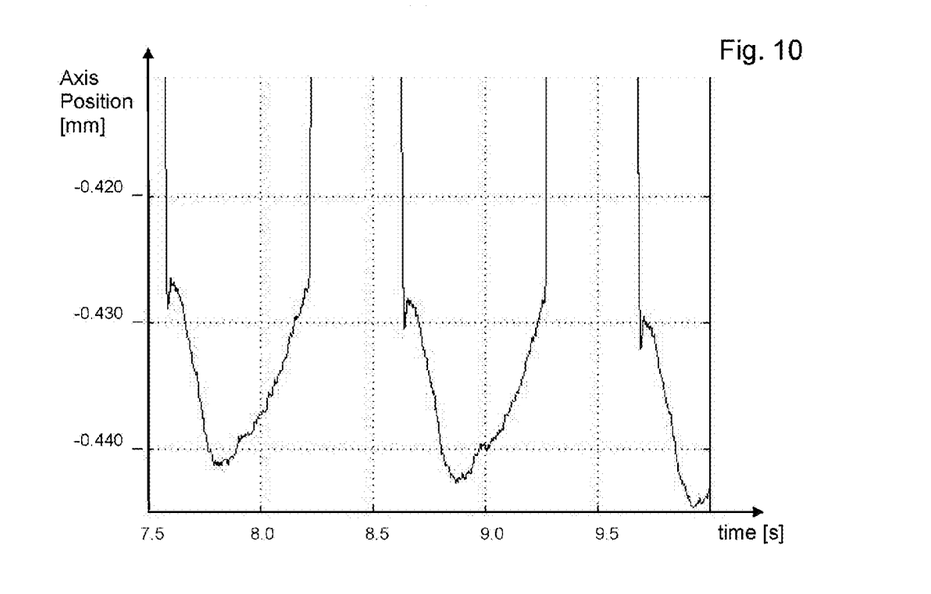

The processes illustrated in FIGS. 8, 9 and 10 are respectively conducted with a process control using ILC according to the first embodiment of the present invention, with varying tuning parameters of the ILC. The design of the controller parameters implies balancing between smoothness and convergence speed. Particularly, the process shown in FIG. 10 shows a remarkable smoothness. It has been found that the more steady movement within an erosion cycle contributes to an increased number of removal-effective pulses.

Figure 12:
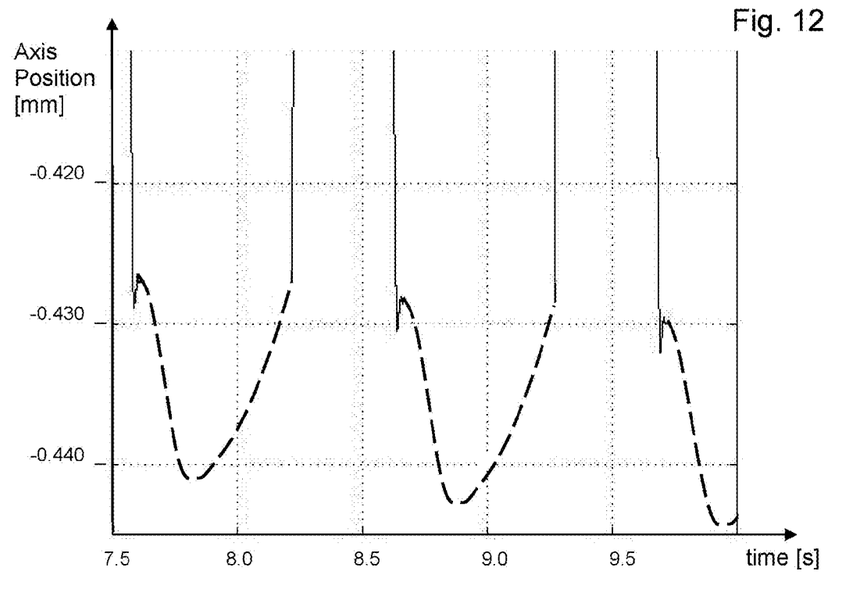
FIGS. 12, 13 and 14 are plots of the axis position of a tool electrode as a function of time with a process control using ILC and curve fitting, according to an embodiment of the present invention.
Figure 13:
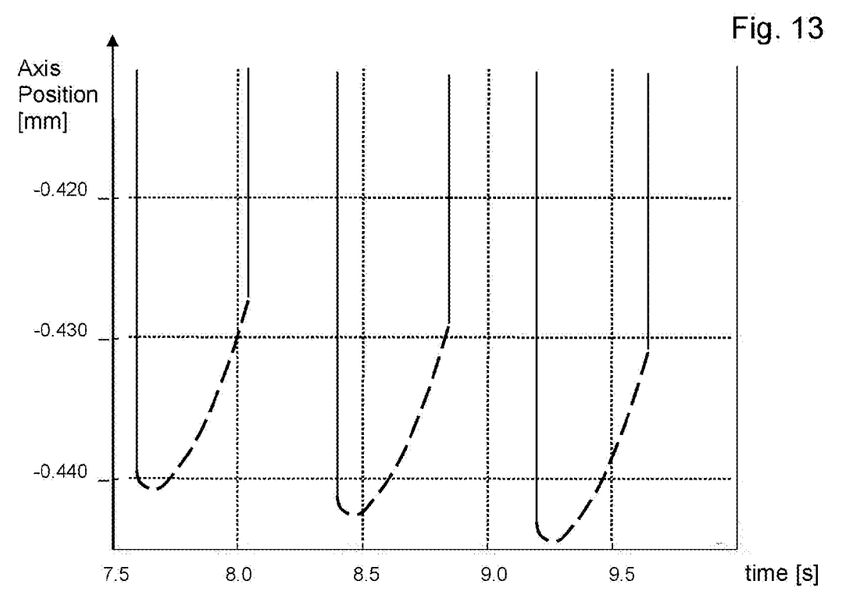
Figure 14:
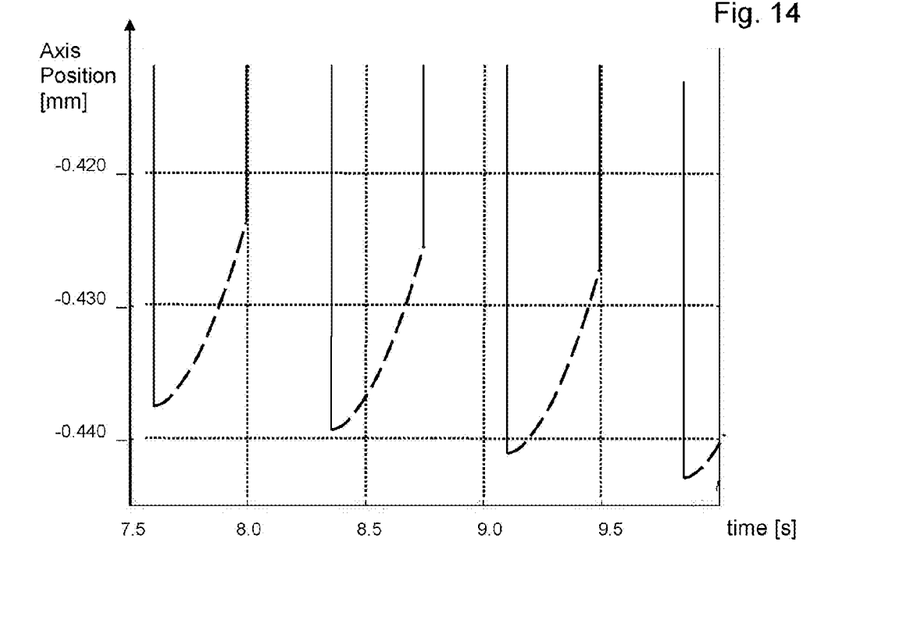

FIGS. 12, 13 and 14, respectively, show the axis position as a function of time during a few discharge cycles of a die-sinking operation, whereas the process is conducted using ILC and curve fitting. The electrode position trajectory is smooth and the pattern of each trajectory is basically similar to the preceding one. The difference between FIG. 12 and FIG. 14 is that in FIG. 12 the approaching section is present, while in FIG. 14 the axis return position is determined such that there is no approaching section.

Figure 16:
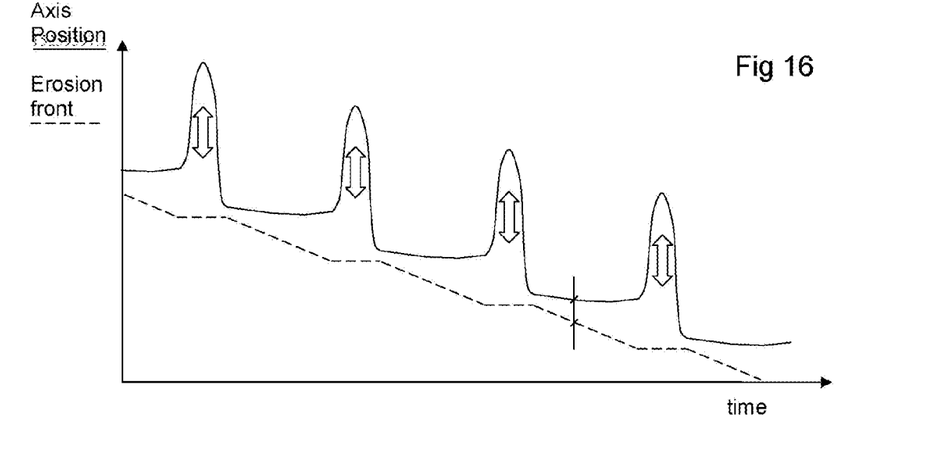
FIGS. 16 and 17 are simplified graphs of the axis position of a tool electrode and the position of the erosion front as a function of time over several discharge cycles according to an embodiment of the present invention.
Figure 17:
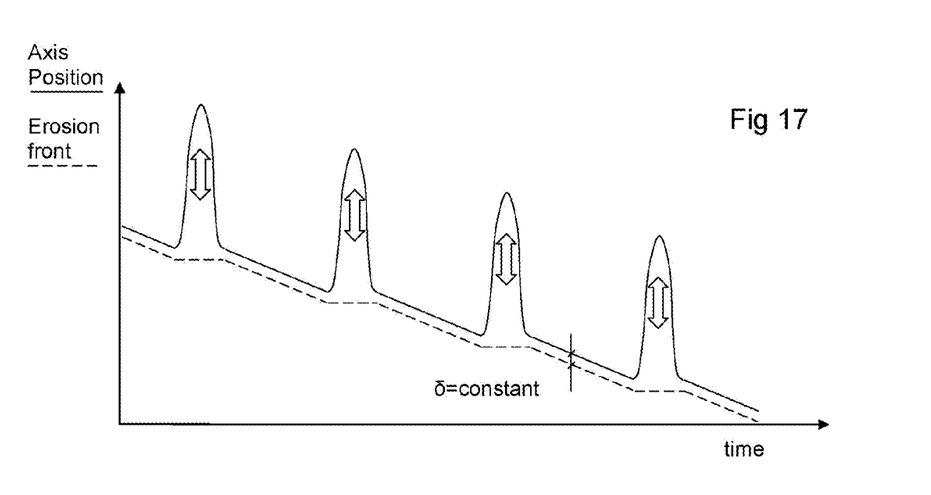

In an alternative embodiment of the invention illustrated in FIGS. 16 and 17, the electrode position trajectory has a predefined shape having no close relation to the instantaneous process conditions. The shape of the electrode position trajectory may be selectable from a predefined list, and shall lead to a specific result with the actual machining operation. In this case only an axis return position, i.e. the position where the axis control is commutated from a jump motion control to a process control, is computed with a specific algorithm, as explained later on. A predefined curve shape is selected and the curve parameters (for example: offset, slope) are successively computed by the control, so as to match with the actual machining operation.

In the above and other embodiments in which the electrode position trajectory is specified in advance, the evolution of the working gap distance δ may not reflect the increasing contamination within the erosion cycle. The conductivity of the working gap may significantly change within an erosion cycle. To counteract an early deterioration of the working conditions, at least one other significant process parameter, for instance the pulse voltage or the pulse pause can be changed at least once within an erosion cycle.

The methods described above, that is a method for controlling an EDM process with ILC, a method for obtaining an electrode position trajectory by curve fitting, a method for defining an electrode position trajectory of preset shape and a conventional process control method may be combined with each other within an erosion cycle, for instance the electrode position trajectory may comprise a predefined curve shape in a first section and a computed trajectory in a second section in some embodiments. Further, as shown in FIG. 15, the erosion cycle may be subdivided in two distinct sections, i.e. a first section in which the electrode approaches the erosion front after the jump motion and a second section (expanding section) in which the working gap distance increases with the progressive gap contamination. Thus it is possible to define two or more curves for each erosion cycle.

It is emphasized that the process control method according to an embodiment of the present invention may be used in sequence with a conventional EDM process control method. For instance, in some embodiments a conventional process control method is used at the beginning of the machining operation, since at the beginning there is no historical information, and then it is switched to the ILC process control at a depth of e.g. 0.2 mm. Also, when major discontinuities occur within a specified number of runs, the process control may temporarily switch to a conventional control method. A major discontinuity may appear at any moment, but in particular with sudden changes of the engaged electrode surface, change in the flushing conditions, with a breakthrough in EDM drilling, or else. The ILC process control may be restored as soon as the process assumes an enough repetitive pattern.

In another embodiment of the present invention an axis return position is determined—or more generally an offset of the electrode position trajectory. As explained above, the axis return position is the position where the control of the axis is assumed by the process control after a jump motion. Obviously the axis return position must be set at a safe distance above the current erosion front on the workpiece. As described with reference to FIG. 2, with a conventional process control the working gap distance δ is very fluctuating. For this reason with a conventional process control the axis return position is sometimes defined with a so called float distance, i.e. a safe distance relative to the last interpolated axis position of the erosion cycle before the jump motion. In this way the erosion cycle is resumed safely but the approaching to the erosion front is not optimized, because the axis return position is slightly distant from the erosion front.

With an embodiment of the present invention, any characteristic value of the electrode position trajectory, for instance the minimum of the trajectory and any other point of the trajectory can be easily computed. For instance, in some embodiments the last point of the trajectory can be identified very well, so that a float distance can be reduced considerably. Alternatively, the minimum of the trajectory is computed and used to identify a safe return position for the actual process conditions, said safe return position being as close as needed to the erosion front.

In some embodiment a process, as illustrated in FIG. 12, is conducted with a process control using ILC and curve fitting, but without optimization of the axis return position after a jump motion. The process illustrated in FIGS. 13 and 14 comprises additionally an optimization of the axis return position. In the case shown in FIG. 13 the axis return position is just above the computed electrode position trajectory while in the case shown in FIG. 14, the axis return position is also the initial point of the electrode position trajectory.

In an alternative embodiment of the invention at least one parameter of a process pause period is computed on the basis of at least one process parameter of at least one previous cycle. For instance, the length, the speed and/or frequency of a jump motion may depend on a characteristic of a mathematical function representing the electrode position trajectory and/or on other parameters of past or previous electrode position trajectories.

Resuming, in some embodiments the control system is able to learn from the past and iteratively adapt the electrode position trajectory. Thus, in some embodiments a higher process stability is achieved and, hence, also a higher productivity (MRR) linked with less electrode wear and an improved surface quality and homogeneity.

The invention has been particularly described referring to a method and apparatus for controlling the working gap distance of an EDM process composed of recurring cycles, wherein the recurrence is given by repetitive succession of machining periods given by the erosion cycles and pause periods given by the flushing movements. It is understood that other methods to restore the working gap conditions after an erosion cycle may also be adopted in a cyclical manner, so as to constitute a recurring pattern. Such alternative methods to restore the process conditions may be a prolonged pause, an active flushing pulse, any other electrode movement, etc.

The invention leads to a continuous and smooth movement of the tool electrode within the erosion cycles. In some embodiments the working gap distance grows continuously with the increasing contamination within the erosion cycle. In some case one or more so called short jump motions are executed within an erosion cycle. In this way the debris are distributed and the working gap conditions are uniformized without a process pause cycle, so that the erosion cycle can be extended.

Some embodiments of the invention are particularly useful to control a micro EDM process, because with very small electrodes the reference parameters are even more fluctuating.

Some embodiments of the invention have been described particularly using the ignition delay time td as the appointed quantity of interest. As mentioned above and described exemplary with reference to FIG. 1, the process may be controlled in some embodiments using other process information such as the pulse voltage or other values related to the process conditions. The above embodiments use the axis position as the appointed actuation. It is to be noted that other values may be controlled instead or in conjunction with the axis position in other embodiments.

Some embodiments of the invention may also include other recurring operations in the field of EDM, for example large series of similar or identical operations, such as the production of holes, grooves or any other repeating geometric feature.

One particular case of recurrence is observed with the EDM drilling operation of large series of holes, in the production of turbine cooling holes, printer nozzles, injector nozzles, etc. For instance, in the manufacture of fuel injector nozzles several identical micro holes are produced by EDM drilling. These injectors are produced in series of many thousand identical parts each day.

In such an embodiment the drilling operation and the restoring operation, i.e. returning to the start condition, defines the recurrence. The electrode position trajectory of the current micro drilling operation is based on the instantaneous process parameters and on at least one significant process parameter being indicative of the working gap distance of at least one past micro drilling operation.

This embodiment leads to a higher process steadiness, thus less variance in the machining result, which is particularly desirable in the cited case of fuel injector nozzles. Also higher productivity (MRR), less electrode wear and an improved surface quality may be achieved.

The invention claimed is:

1. A method for controlling an electric discharge machining process, wherein a tool electrode is moved relatively to a workpiece with a working gap distance, wherein the process comprises a current and at least one previous erosion cycle, the current and the at least one previous erosion cycle each being divided into predetermined time intervals each comprising at least one discharge pulse, and wherein the current erosion cycle and the at least one previous erosion cycle are separated by a process pause cycle that is operable to restore a working gap condition, the working gap condition of the current erosion cycle and the previous erosion cycle being substantially similar, the method comprising the steps of:

measuring a value of an indicative process parameter within the time interval of the previous erosion cycle, the indicative process parameter being indicative of the working gap distance;

determining a deviation value based on the measured value and a desired value of the indicative process parameter of the time interval of the previous erosion cycle; and in the current erosion cycle, controlling the relative movement of the tool electrode in a current erosion direction within the time interval of the current erosion cycle based on the deviation value determined for the time interval of the previous erosion cycle and at least one instantaneous process parameter that is indicative of an instantaneous process condition.

2. The method according to claim 1, wherein each current and previous erosion cycles are divided into predetermined time intervals 1, ..., k, ..., N, and wherein the time interval k of the current erosion cycle and the time interval k of the previous erosion cycles have the same length.

3. The method according to claim 2, wherein the relative movement of the tool electrode is controlled for the $k^{th}$ time interval of the current erosion cycle based on the deviation value determined for a ..., $(k-2)^{th}$, $(k-1)^{th}$, $k^{th}$, $(k+1)^{th}$, $(k+2)^{th}$, ... time interval of the previous erosion cycle.

4. The method according to claim 1, further comprising the step of generating a command value for controlling the relative movement of the tool electrode within the time interval of the current erosion cycle, based on the determined deviation value for the time interval of the previous erosion cycle and the instantaneous process parameter.

5. The method according to claim 1, further comprising the step of computing a tool electrode position trajectory on the basis of the determined deviation value.

6. The method according to claim 5, wherein the computing of a tool electrode position trajectory comprises the fitting with a mathematical function.

7. The method according to claim 5, wherein the shape of a tool electrode position trajectory is preset and at least one process parameter is changed within an erosion cycle based on the determined deviation value.

8. The method according to claim 1, wherein the process pause cycle comprises at least one of the following actions to restore the working gap condition:
a jump motion of the tool electrode,
a prolonged process pause without erosion pulses,
an active flushing pulse,
a magnetic field pulse, and
another tool electrode movement.

9. The method according to claim 1, wherein the indicative process parameter of the previous cycle is at least one of:
an ignition delay time (td),
a mean pulse voltage,
a discharge voltage.

10. The method according to claim 1, wherein an axis return position of the tool electrode is adapted on the basis of at least one characteristic of at least one previous electrode position trajectory.

11. The method according to claim 1, wherein at least one actuation parameter of the process pause cycle is computed on the basis of the determined deviation value.

12. The method according to claim 1, further comprising: within the time interval of the current erosion cycle, controlling at least one further actuation parameter based on the deviation value determined for the time interval of the previous erosion cycle.

13. The method according to claim 12, wherein the at least one further actuation parameter is at least one of: an ignition voltage, a discharge current, a discharge duration, a pause time between two successive pulses, a pulse frequency, and the frequency and/or stroke of a short jump motion within an erosion cycle.

14. The method according to claim 1, wherein the erosion cycle is represented by a complete micro electric discharge machining drilling operation.

15. An apparatus for controlling an electric discharge machining process, wherein the process comprises a current and at least one previous erosion cycle, the current and the previous erosion cycle each being divided into predetermined time intervals each comprising at least one discharge pulse, and wherein the current erosion cycle and the at least one previous erosion cycle are separated by a process pause cycle that is operable to restore a working gap condition, the working gap condition of the current erosion cycle and the previous erosion cycle being substantially similar, the apparatus comprising: a process controller that is operable to control the electric discharge machining process, and an axis drive configured to drive a tool electrode, wherein the process controller is configured to control the axis drive such that a tool electrode is moved relatively to a workpiece with a working gap distance and wherein the process controller is further configured to:
measure a value of an indicative process parameter within the time interval of the previous erosion cycle, the indicative process parameter being indicative of the working cap distance;
determine a deviation value based on the measured value and a desired value of the indicative process parameter of the time interval of the previous erosion cycle; and
in the current erosion cycle, control the relative movement of the tool electrode in a current erosion direction within the time interval of the current erosion cycle based on the deviation value determined for the time interval of the previous erosion cycle and at least one instantaneous process parameter that is indicative of an instantaneous process condition.

16. The apparatus according to claim 15, wherein the apparatus is an electric discharge machine.

* * * * *